United States Patent [19]

Ballantyne et al.

[11] 3,865,638

[45] Feb. 11, 1975

[54] PLASTICALLY DEFORMED HARDENED STEEL PARTS AND METHOD OF FORMING SAME

[75] Inventors: David B. Ballantyne, Southfield; Edward R. Mantel, Warren; George H. Robinson, Rochester, all of Mich.

[73] Assignee: General Motors Corp., Detroit, Mich.

[22] Filed: Nov. 23, 1973

[21] Appl. No.: 418,249

[52] U.S. Cl. ................. 148/12.1, 148/16, 148/39, 148/144, 148/145
[51] Int. Cl. ..................... C21d 3/04, C21d 9/46
[58] Field of Search ............. 148/12.1, 39, 16, 144, 148/145

[56] References Cited
UNITED STATES PATENTS

| 3,323,953 | 6/1967 | Lesney | 148/39 |
| 3,406,047 | 10/1968 | Magor et al. | 148/39 |
| 3,411,208 | 11/1968 | Malm | 148/39 |

Primary Examiner—W. Stallard
Attorney, Agent, or Firm—Robert J. Wallace

[57] ABSTRACT

Articles are made by plastically deforming hardened steel sheet stock having relatively deep ferrite outer surface zones and a through hardened central core with an abrupt transition between the ferrite surface zones and the central core. Plastically deformed steel articles such as steel rule dies and automobile door guard beams made from such stock are described.

6 Claims, 5 Drawing Figures

PATENTED FEB 1 1 1975　　3,865,638

PLASTICALLY DEFORMED HARDENED STEEL PARTS AND METHOD OF FORMING SAME

BACKGROUND OF THE INVENTION

This invention relates to plastically deformed articles made of a unique multilayered hardened steel sheet stock and to a process for producing such articles.

When ultimate hardness in a stamped article is desired, a soft sheet stock can be stamped first into the desired shape, and hardened afterwards. However, in most instances, it is preferred to harden the sheet stock first, and then plastically deform it into the desired shape. It should be mentioned in this latter connection that the harder the sheet stock used in making the articles, the stronger they are, the more resistant to abrasion they are, and the like. Accordingly, in this latter instance one generally desires to use the maximum hardness of sheet stock that he can for the particular product being made. However, the harder a sheet stock is, the less ductile it is. The less ductile it is, the less formable it is. The maximum hardness of sheet stock that one can use in making an article by plastic deformation is limited by the formability of the sheet stock, and the shape of the part being made. For example, the smaller the radius of curvature in any portion of the part being formed, or the severer the plastic deformation involved, the softer the steel must be. In general, one would prefer to use the hardest steel sheet stock that is formable for the given application to give him the highest strength, resistance to abrasion, etc.

As is already recognized, when hardened steel sheet stock is plastically deformed beyond its limit of formability, at least latent defects are produced, which can reduce fatigue life of the resultant part. However, even more catastrophic effects can occur. Surface ruptures become visible, and complete rupture through the thickness of the sheet can result. As for example, hardened strips bent about too small a radius can break in half, and stamped sheets will tear at a critical bend.

As a compromise it has long been a practice to use softer but thicker steels to make stamped parts of given strengths. Where resistance to abrasion is important, increased thickness may not even help, as for example where the part has a cutting edge on it. In such instance, the part must be formed at a sacrifice in abrasion resistance on the cutting edge, or the part must be formed as an assembly, with the cutting edge being attached as a separate member.

We have found a unique steel sheet stock for making plastically deformed articles that permits stock of higher hardness to be used. As mentioned, the harder the sheet stock used, the stronger the resultant article and the more resistant it is to abrasion. With this discovery we have been able to produce improved articles such as cutting dies, reinforcing structures and the like. This discovery is particularly applicable to steel sheet stock of a hardness greater than about 40 Rc, since stock above this hardness has especially poor formability characteristics.

OBJECTS AND SUMMARY OF THE INVENTION

It is, therefore, an object of this invention to provide improved plastically deformed articles.

A further object of this invention is to provide a unique process for making articles from hardened steel sheet stock by plastic deformation.

These and other objects of the invention are obtained by plastically deforming a steel sheet having a relatively deep soft outer ferrite layer on each of its major surfaces, between which is sandwiched a through hardened steel layer, or central core, with an abrupt transition in carbon concentration there-between. The soft ferrite layers have a thickness about 5 percent – 20 percent of the total thickness of the sheet and the central core has a hardness in excess of about 40 Rc. The outer ferrite layers are integral zones formed by decarburization, with the central core hardened by austenization and subsequent quenching. Decarburization, austenization, and quenching are carefully controlled to obtain the abrupt transition in carbon concentration between the soft outer ferrite surface zones and the hardened central core.

BRIEF DESCRIPTION OF THE DRAWING

Other objects, features and advantages of the invention will become more apparent from the following description of preferred embodiments thereof and from the drawing, in which.

DESCRIPTION OF THE PREFERRED EMBODIMENTS

Figure 1:
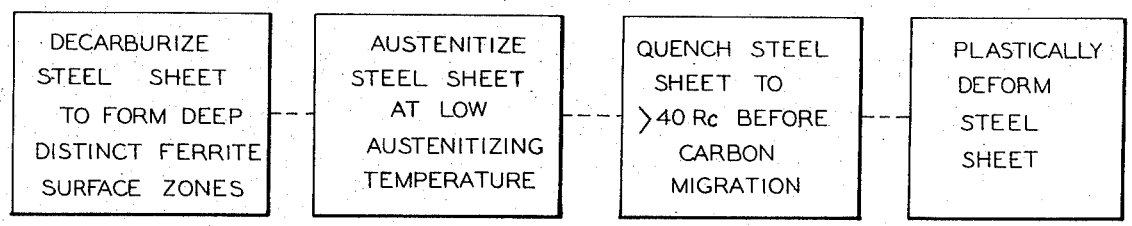
FIG. 1 diagrammatically illustrates the process of this invention.

As can be seen in connection with FIG. 1, this invention includes a process for making plastically deformed articles from a unique hardened steel sheet. The steel sheet has uniform ferrite outer surfaces, a hard central core, and an abrupt transition in hardness therebetween. The abruptness of this hardness, or carbon concentration, transition is a principal factor in obtaining the attributes of this invention. The softer outer ferrite zones must be wide enough to impart greater formability but not so wide as to sacrifice strength characteristics attributable to the hardened central core.

The formability of steel sheet stock having a thickness of approximately 0.01 – 0.08 inch in thickness and having a hardness in excess of about 40 Rc can be increased if the ferrite outer zones are virtually carbon-free and of appropriate thickness. It is recognized that hardened steel sheet stock as delivered from a steel supplier may have a thin decarburized surface zone. This invention contemplates a considerably thicker decarburized surface zone. The soft steel, ferrite, zones in accordance with our invention should have a thickness of approximately 5 percent – 20 percent of the total sheet thickness. It is contemplated that sheet stock of this type could be produced by laminating a sheet of hard steel between two much softer steel sheets to form a composite multilayer sheet stock. The sheets could be bonded together by welding, brazing, or the like. However, such sheet stock is inherently subject to imperfections and nonuniformities in the bonding process, which seriously limit utility of the product for plastic deformation purposes. On the other hand, when such a multilayered sheet is formed as an integral structure, its utility for plastic deformation is considerably broadened, and significant improvements in formability are consistently obtained. This invention is directed to utilization of sheet stock having integral ferrite soft outer zones.

A unique process for producing such an integral steel sheet stock is described in u.S. Pat. application No. 418,674, entitled "Improved Hardened Steel Sheet Stock and process for Making It," which is filed concurrently herewith in the names of Edward R. Mantel et al., and which is assigned to the assignee of this invention. U.S. Pat. application No. 418,674 describes making the steel sheet stock by treating 0.083 inch thick plain carbon steel, SAE 1065 strip. The strip had a superficial decarburization approximately 0.001 inch deep, poor ductility, and a core hardness of 43 Rc, as supplied from the manufacturer. The microstructure of the strip suggested that heat treatment by the supplier was an austempering type of hardening treatment.

The strip was heated in a furnace for 2 hours at 1,350°F. in a dry high nitrogen-low hydrogen atmosphere that consisted essentially of nitrogen and 3½ percent by volume hydrogen, produced by catalytic association of ammonia. In general, we prefer a hydrogen content of about 3 percent – 5 percent by volume. Higher hydrogen proportions can be used. However, hydrogen proportions greater than about 7 percent present special handling problems which we prefer to avoid. The dew point of the high nitrogen-low hydrogen atmosphere introduced into the decarburization furnace was minus 40°F. However, it is presumed that the actual dew point in the furnace could have risen to as high as a minus 20°F. or even 0°F., due to leakage of ambient air into the furnace. In any event the high nitrogen-low hydrogen atmosphere was relatively dry. No appreciable scale was produced on the strip, and therefore no appreciable surface defects were introduced.

After decarburization, the strip was rapidly heated to a temperature of approximately 1,550°F. and held at this temperature for 5 minutes. It was immediately then quenched to 600°F. in a molten salt and held there for 1 hour before being withdrawn and allowed to cool to room temperature.

The strip thus treated had soft outer surface zones of total decarburization approximately 0.008 inch deep, with a central core hardness of 30 Rc at 0.01 inch deep and 38 Rc at 0.012 inch deep. Maximum core hardness of 47 – 48 Rc was achieved at a depth of 0.02 inch. The steel gradient in hardness change to about 40 Rc is attributable to the abruptness in transition in carbon concentration between the outer ferrite zones and the inner core. The shallower transition above 40 Rc is not due to loss of core carbon content as much as to the nature of core hardening heat treatment involved.

The depth of decarburization desired will vary depending on the core hardness that is to be produced and the thickness of the sheet and, of course, the formability characteristics desired. The higher the core hardness to be produced and the thicker the sheet stock, the deeper the decarburization must be. For example in sheet thicknesses of about 0.03 inch in which the average core hardness is to be only slightly above 40 Rc, the decarburization depth on each surface need only be about 5 percent of the total sheet thickness. However, for sheet thicknesses over 0.05 inch in which a resultant average core hardness greater than 50 Rc is to be produced, the decarburization depth is preferably about 10 percent. As high as 20 percent of the total sheet thickness may be desired for thicker sheets of high resultant core hardness.

In general, it was found that plain carbon steels can be decarburized to form satisfactory outer ferrite zones in dry decarburizing atmospheres at about 1,300° – 1,400°F. The decarburization temperatures should be within 50°F. of, and preferably below, the $A_1$ temperature of the steel involved, although temperatures as low as 100°F. below the $A_1$ temperature are feasible. In heat treating the undecarburized central core of the decarburized sheet to the desired hardness, care should be taken to minimize migration of carbon from the central core to the decarburized outer zones. Accordingly, the austenitizing temperature should be maintained as low as practical above the $A_1$ temperature, unless austenization is accomplished very quickly. In general, an austenitizing temperature between the $A_1$ and $A_3$ temperature of the steel involved can be used. Plain carbon steels can generally be austenitized at 1,500° – 1,600°F.

Any of the normal and accepted rapid cooling techniques can be used, with or without tempering, which produces the desired central core hardness above about 40 Rc. While the aforementioned example of this invention describes an austempering technique for hardening, quenching from austenitizing temperatures onto oil or water may in some instances be preferred. However, cooling should be started before any significant migration of carbon from the central core into the decarburized zones can occur that would decrease the abrupt change in carbon concentration desired. The central core carbon concentration, of course, is determined by the carbon content in the sheet stock which is decarburized, which can vary from about 0.15 percent – 0.8 percent carbon. As might be expected, the hardness of the central core will vary with its carbon concentration and the hardening heat treatment which is used. In any event, the central core will have a thickness about 60 percent – 90 percent of the thickness of the sheet and a hardness substantially throughout this thickness of at least about 40 Rc. If the sheet stock is to be used in an article having a cutting edge, a hardness of at least 45 Rc, and preferably 50 – 55 Rc through the major thickness of the core is preferred.

The unique integral multilayer sheet stock of this invention gives steels of higher core hardnesses and yield strengths formability characteristics of steels having an entire thickness through hardened to a significantly lesser hardness. Such a sheet stock can be used to make an improved steel rule cutting die such as shown in connection with FIGS. 2 through 4 hereof. Steel rule cutting dies are of particular use in cutting a given cloth pattern from many layers of fabric at one time.

Figure 2:
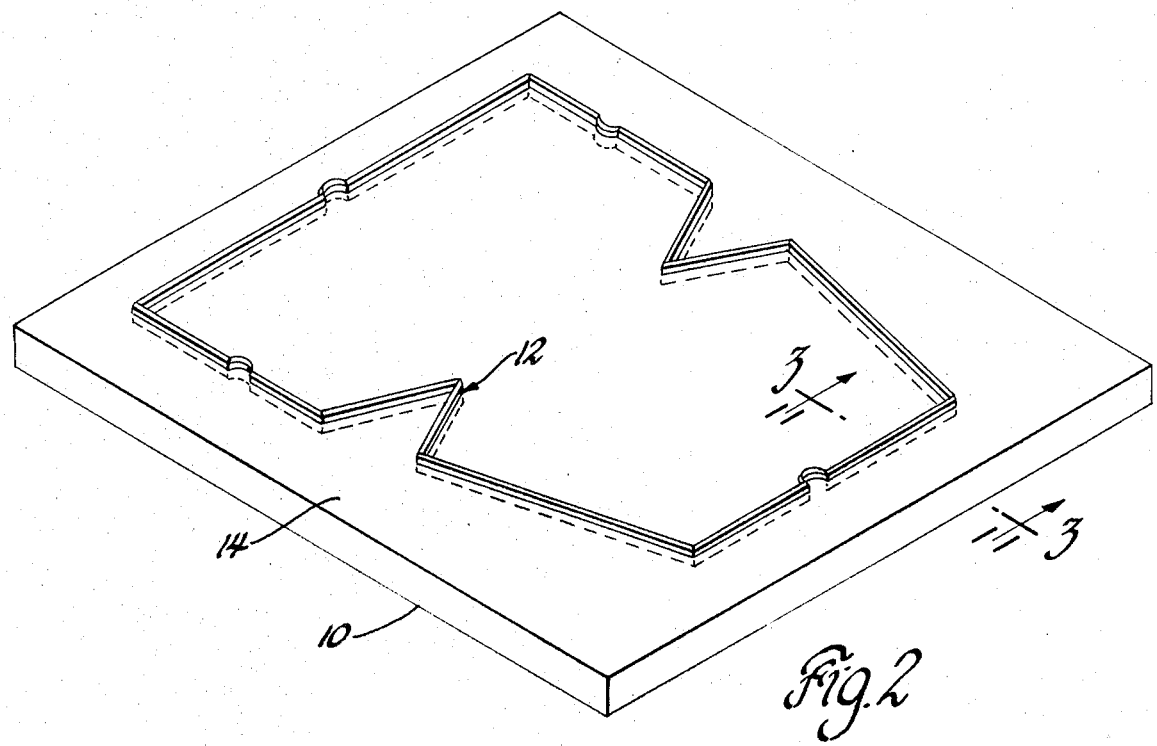
FIG. 2 is an isometric view showing a steel rule fabric cutting die made in accordance with this invention.
Figure 3:
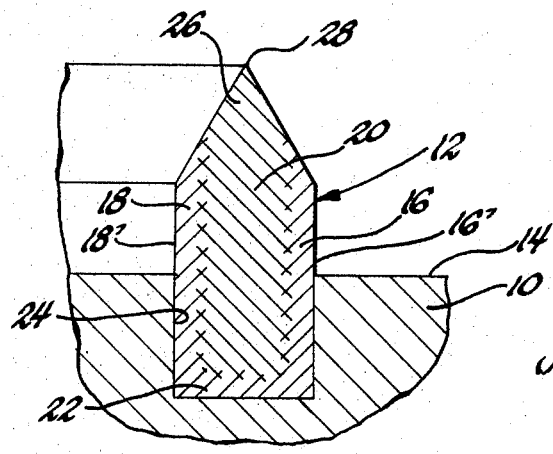
FIG. 3 shows an enlarged fragmentary sectional view along the line 3—3 of FIG. 2.

A steel rule cutting die can be simply considered as including a support member 10 and a 0.083 inch thick cutter strip 12 affixed edgewise to a major face 14 of support 10. Strip 12 is of an integral decarburized multilayer plain carbon steel sheet stock such as hereinbefore described. It has about 0.008 inch thick outer ferrite zones 16 and 18 and a hardened central core 20. The cutter strip 12 is bent into a configuration corresponding to the pattern to be cut, as can be seen in FIG. 2. As can be seen more clearly in connection with FIG. 3, cutter strip 12 has its major faces 16' and 18' perpendicular to face 14 of the support. One edge 22 of the strip is nested within a groove 24 within face 14 of support 10. It can be retained in the groove by friction, soldering, brazing, adhesives, or the like. The opposite edge 26 of the strip is ground to knife-like sharpness along its length to provide a fabric cutting edge. The apex 28 of the cutting edge 26 lies within the hardened central core 20, which is preferably heat treated to a hardness of at least 45 Rc, and preferably 50 – 55 Rc.

Figure 4:
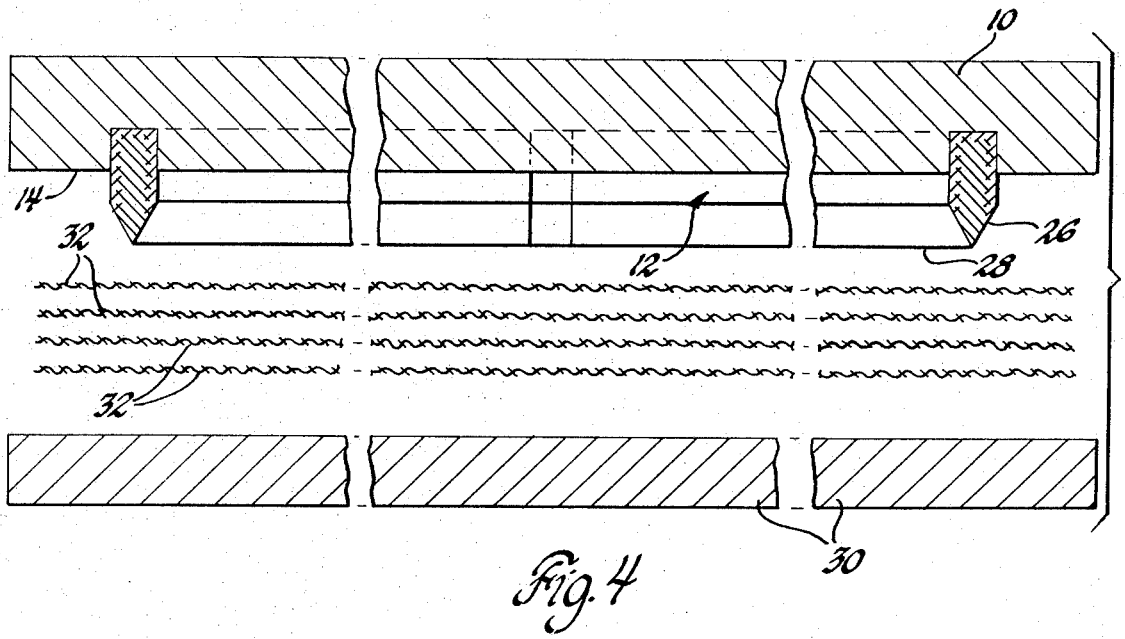
FIG. 4 shows a sectional view of an assembly including a steel rule fabric cutting die such as shown in FIG. 2.

FIG. 4 shows such a cutting die in register over a platen 30 which supports a plurality of layers 32 of fabric which are to be cut into a plurality of patterns of desired shape. Lowering the support 10 brings apex 28 of knife edge 26 into engagement with the layers of cloth 32 on platen 30. When support 10 is lowered further, knife edge 28 cuts through the layers 20 of cloth and abuts platen 30, cutting each layer of cloth into a predetermined pattern.

Since the steel rule die is essentially a cutting device, its cutting edge should be made of as hard a steel as possible to maintain its sharpness. However, in order to produce such cutting dies economically, it is preferred to simply bend a steel strip into the desired shape, and recess it within a groove in a supporting member. If the bends are of too small a radius of curvature for the hardness of strip being used, the steel strip may weaken and even break on bending. In such instance, it is necessary to either use a softer strip for the die, or make the die as an assembly of brazed pieces of harder material. In many instances the increased cost of making the die in the latter manner does not offset the increased life which is obtained. Accordingly, it is still preferred to use a softer but more formable strip, which inherently has a lesser lifetime in use. By means of this invention a harder steel can be used in such dies.

It is also contemplated that the benefits of this invention can be obtained in making products where strength is of greater importance than abrasion resistance. Since a steel sheet stock having a higher effective hardness can be used in forming a given article, stronger parts can be formed with the same thickness of sheet stock. They will support greater loads and be more resistant to impact deformation. Conversely, thinner sections of effectively harder material can be used to obtain weight savings.

Figure 5:
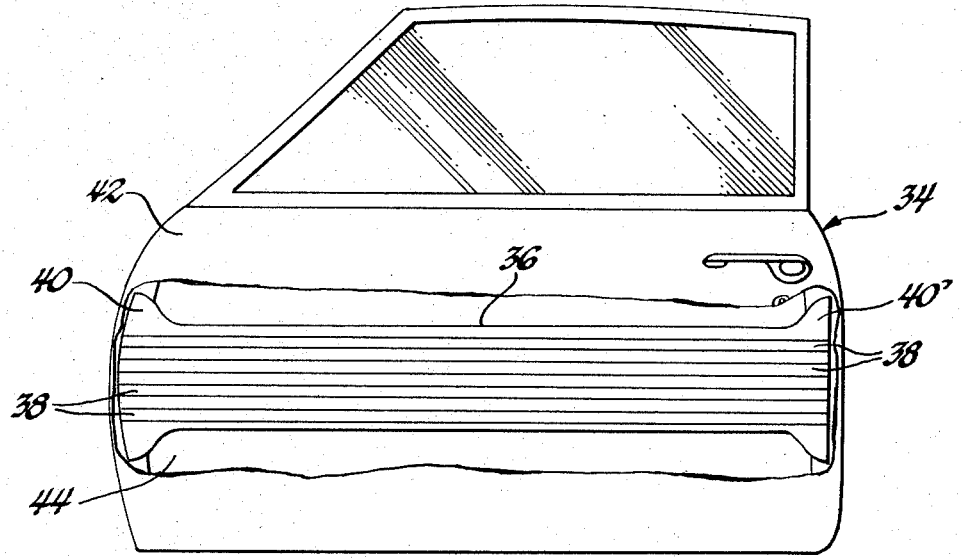
FIG. 5 shows an elevational view with parts broken away of a guard beam in an automobile door.

A specific example of an improved load supporting structure is shown in FIG. 5. FIG. 5 illustrates an automobile door 34 having a guard beam 36. The guard beam is a reinforcing structure within the automobile door that is used to reduce intrusion into the automobile passenger compartment upon side impact of the automobile. The guard beam is generally an elongated structure made by plastic deformation of a relatively thick, 0.04 – 0.07 inch, steel sheet stock. The guard beam can have embossments to increase its load supporting capability, and resistance to deformation on impact. The embossments can be in the form of a plurality of parallel corrugations 38 extending longitudinally along the length of the guard beam between opposite end portions 40 and 40'. The opposite end portions 40 and 40' are adapted for mounting within the interior of the automobile door 34, between the outer panel 42 and the inner panel 44.

Such a guard beam 36 can be made in accordance with this invention by initially decarburizing both faces of a sheet stock in the manner such as hereinbefore described, hardening the interior of the sheet to a hardness of at least 40 Rc, and then plastically deforming the decarburized sheet into the appropriate shape by stamping or the like. As set forth in the preceding examples of this invention, the outer decarburized zones should have a thickness of about 10 percent – 20 percent of the total thickness of the sheet, with the outer 90 percent of the decarburized zones having a residual carbon concentration of less than 0.01 percent by weight. The same abrupt change in carbon concentration between the outer decarburized zones and the inner core is desired in this example of this invention as in the preceding examples. By this invention, materials of higher core hardness and average strength can be used to make stronger guard beams, or thinner sheet thicknesses can be used to make guard beams as strong but lighter.

The claims:

1. A method of making plastically deformed metal parts from through hardened steel sheet stock comprising the steps of:

decarburizing both major surfaces of a through hardening steel sheet about 0.01 inch – 0.08 inch in thickness to produce a sharply defined zone of ferrite on each of said sheet major surfaces, with an abrupt change in carbon concentration to an undecarburized central core of through hardening steel therebetween, continuing said decarburization until said ferrite zones expand in thickness to about 5 percent – 20 percent of the thickness of said sheet, while maintaining at least the outer 90 percent of the outer thickness of said zones at a carbon concentration below about 0.01 percent by weight, austenitizing said sheet without inducing migration of carbon from said central core into said decarburized zones that significantly alters said abrupt change in carbon concentration, rapidly cooling said austenitized decarburized sheet to through harden said central core to a hardness of at least about 40 Rc before migration of carbon from said central core into said decarburized zones can significantly alter said abrupt change in carbon content between said ferrite zones and said central core, and plastically deforming said sheet into a desired shape.

2. A method of making plastically deformed metal parts from through hardened steel sheet stock comprising the steps of:

decarburizing both major surfaces of a through hardening steel sheet 0.01 inch – 0.08 inch in thickness by heating said sheet at a temperature within 50°F. of the $A_1$ temperature of said sheet in a dry disassociated ammonia atmosphere consisting essentially of nitrogen and about 3 percent – 5 percent by volume hydrogen to obtain an abrupt change in carbon concentration in said sheet below said surfaces, continuing said decarburization for a sufficient duration to produce a scale-free decarburized zone contiguous each of said major surfaces and a substantially undecarburized central core therebetween, in which the decarburized surface zones have a thickness approximately 5 percent – 20 percent of the sheet thickness and at least the outermost 90 percent of the thickness of each of said zones has a residual carbon concentration below about 0.01 percent by weight that increases formability of said sheet, heating said sheet in a protective atmosphere to a temperature between the $A_1$ and $A_3$ temperature of said sheet to austenitize said central core but not induce rapid carbon migration from it into said decarburized zones thickness, rapidly cooling said austenitized decarburized sheet before carbon migration from said central core into said outermost zone thickness can increase said carbon concentration above about 0.01 percent by weight and significantly decrease the abruptness of said change in carbon concentration between said surface zones and said central core, so as to produce a hardened central core that has a thickness about 60 percent – 90 percent of the thickness of the sheet and a hardness of at least about 40 Rc, and plastically deforming said sheet into a desired shape having at least one radius of curvature beyond the formability of said sheet if its entire thickness were of the same hardness as said central core.

3. A method of making plastically deformed metal parts from through hardened plain carbon steel sheet stock comprising the steps of:

decarburizing both major surfaces of a through hardening plain carbon steel sheet 0.05 inch – 0.08 inch in thickness by heating said sheet at a temperature of 1,300° – 1400°F. in a disassociated ammonia atmosphere consisting essentially of nitrogen and about 3 percent – 5 percent by volume hydrogen and having a dew point less than about 0°F. to obtain an abrupt change in carbon concentration in said sheet below said surfaces, continuing said decarburization for a sufficient duration to produce a scale-free decarburized zone contiguous each of said major surfaces and a substantially undecarburized central core therebetween, in which the decarburized surface zones have a thickness approximately 10 percent – 20 percent of the sheet thickness and at least the outermost 90 percent of the thickness of each of said zones thickness has a residual carbon concentration below about 0.01 percent by weight that increases formability of said sheet, heating said sheet in a protective atmosphere to a temperature of about 1,550° – 1,600°F. to austenitize said central core but not induce rapid carbon migration movement from it into said decarburized zones, rapidly cooling said austenitized decarburized sheet before carbon migration from said central core into said outermost zone thickness can increase said carbon concentration above about 0.01 percent by weight and significantly decrease the abruptness of said change in carbon concentration between said surface zones and said central core, so as to produce a hardened central core that has a thickness of about 60 percent – 80 percent of the thickness of the sheet and a hardness of at least about 40 Rc, and plastically deforming said sheet into a desired shape having at least one radius of curvature beyond the formability of said sheet if its entire thickness were of the same hardness as said central core.

4. A plastically deformed hardened steel sheet-like article comprising:

a ferrous metal sheet having two major faces and a thickness of less than about 0.01 inch – 0.08 inch, a decarburized surface zone of ferrite on each of said major faces separated by an iron carbide containing hardened central core, said central core having a thickness of about 60 percent – 90 percent of the thickness of said sheet and a hardness in said thickness of at least 40 Rc, said ferrite surface zones each having a thickness approximately 5 percent – 20 percent of said sheet thickness that increases formability of said sheet, a carbon concentration of less than about 0.01 percent by weight in at least the outermost 90 percent of the thickness of said ferrite zones resulting in an abrupt change in carbon content and hardness between said ferrite zones and said central core, and at least one plastic deformation in said sheet having a radius of curvature beyond the formability of said sheet if its entire thickness were of the same hardness as said central core.

5. A steel rule fabric cutting die comprising:

a strip of ferrous metal with two major faces and a thickness of 0.06 inch – 0.08 inch, a decarburized surface zone of ferrite coextensive with both major faces of said strip separated by a hardened iron carbide containing central core having a hardness of about 52 – 56 Rc, said ferrite surface zones each having a thickness about 10 percent – 20 percent of the thickness of said strip, a carbon concentration of less than about 0.01 percent by weight in at least the outermost 90 percent of the thickness of said ferrite zones and a uniform higher carbon concentration substantially throughout the thickness of said central core, so as to provide an abrupt change in carbon concentration between said ferrite zones and said central core, a support for said strip having a substantially flat surface, one edge of said strip secured to said support with the strip major faces generally perpendicular to said support flat surface, at least one bend in said strip transverse to its length about a radius of curvature less than about 0.2 inch, and the other edge of said strip sharpened along its length to an apex within said hardened central core of said strip.

6. In an automobile door guard beam for protection against vehicle side impact, the improvement comprising:

a guard beam of a plastically deformed steel sheet having two major faces and a thickness of 0.04 inch – 0.07 inch, a decarburized outer surface zone of ferrite coextensive with both of said faces separated by a hardened central core, said central core having a thickness of about 60 percent – 90 percent of the thickness of said sheet and a hardness in said thickness of at least 40 Rc, said ferrite surface zones each having a thickness of about 5 percent – 20 percent of the thickness of said sheet that increases formability of said sheet, a carbon concentration of less than about 0.01 percent by weight in at least the outermost 90 percent of the thickness of said ferrite zones and a uniform higher carbon concentration substantially throughout the thickness of said central core, so as to provide an abrupt change in carbon concentration at the interface between said ferrite zones and said central core, and at least one plastic deformation in said sheet having a radius of curvature beyond the formability of said sheet if its entire thickness were of the same hardness as said central core.

* * * * *